No. 719,905. PATENTED FEB. 3, 1903.
J. TCHOOLJIAN.
SEEDING DEVICE.
APPLICATION FILED JUNE 2, 1902.
NO MODEL. 2 SHEETS—SHEET 2.
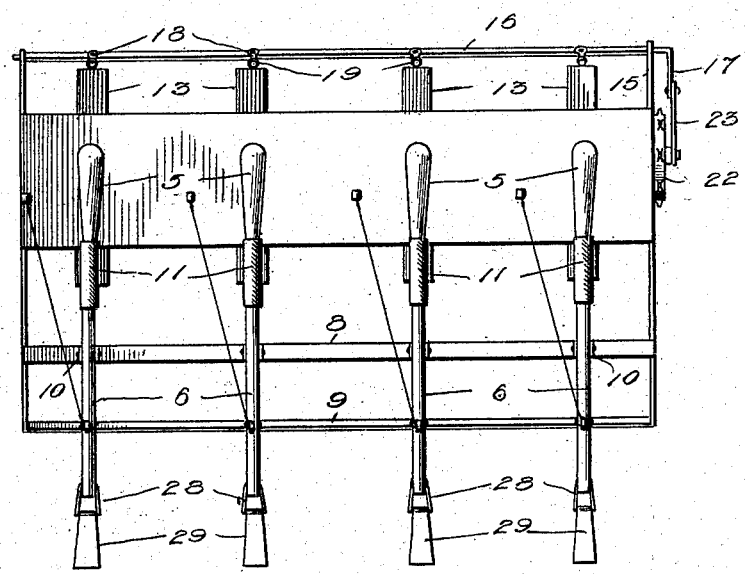
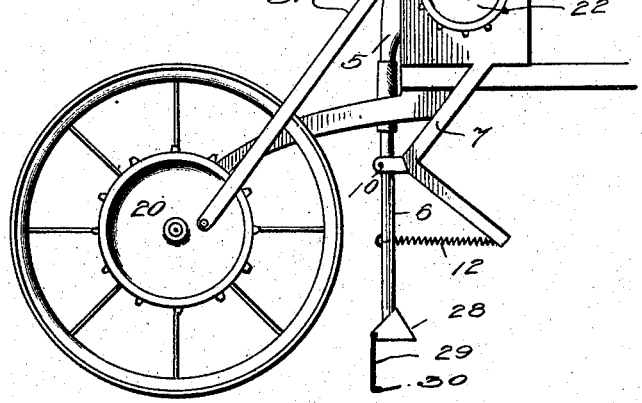
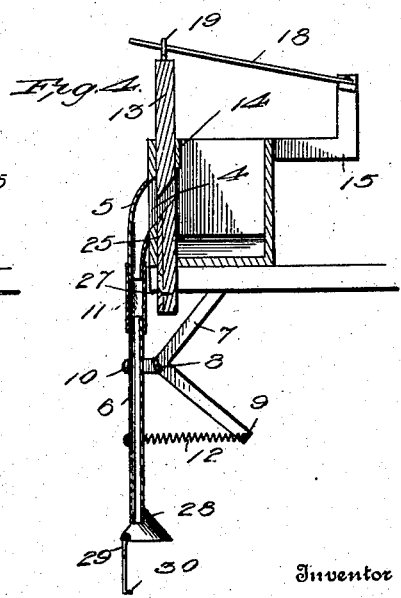
Inventor
Jacob Tchooljian
Witnesses
By Victor J. Evans
Attorney

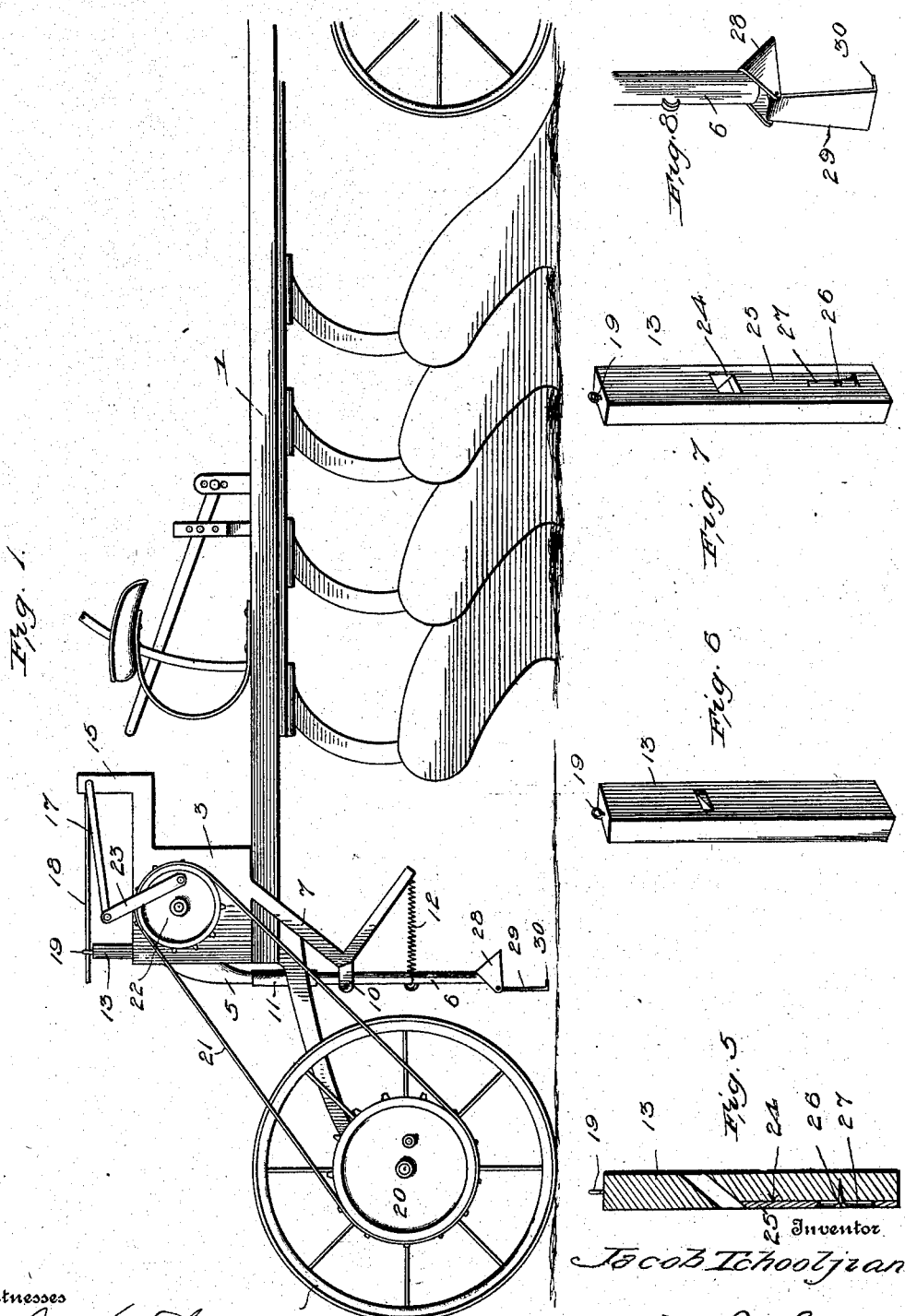

UNITED STATES PATENT OFFICE.

JACOB TCHOOLJIAN, OF DEL REY, CALIFORNIA.

SEEDING DEVICE.

SPECIFICATION forming part of Letters Patent No. 719,905, dated February 3, 1903.

Application filed June 2, 1902. Serial No. 109,998. (No model.)

*To all whom it may concern:*

Be it known that I, JACOB TCHOOLJIAN, a citizen of the United States, residing at Del Rey, in the county of Fresno and State of California, have invented new and useful Improvements in Seeding Devices, of which the following is a specification.

My invention relates to improvements in devices for seeding ground after it has been plowed, and the primary object thereof is to provide a removable seeding attachment of novel construction for gang-plows.

A further object of my invention is to provide suitable mechanism whereby the seeder can be operated through power derived from the plow.

Other objects and advantages of the invention will be fully understood from the following description and claims when taken in conjunction with the accompanying drawings, in which—

Figure 1 is a view in side elevation of a gang-plow provided with my improvement. Fig. 2 is a rear view of my improved seeder attachment removed from the plow. Fig. 3 is a view in side elevation of the rear portion of a gang-plow provided with the present invention and embodying a slight modification. Fig. 4 is a vertical longitudinal section of one of the feed-tubes and hopper. Figs. 5, 6, and 7 are detail views of the feed-slides. Fig. 8 is an enlarged view of the lower end of one of the feed-tubes constructed in accordance with the present invention.

Referring to the drawings by numerals of reference, 1 indicates the main frame of a gang-plow, and 2 indicates one of the bearing-wheels, all of which may be of any suitable construction.

Arranged upon the rear portion of the frame 1 is the seed-hopper 3, which is preferably detachably secured to said frame in any suitable manner. In its rear side the seed-hopper is provided with a series of openings 4, which openings permit the seed to pass from the hopper into the short depending spouts 5 and be discharged therefrom through the seed-tubes 6 upon the ground. Depending from the opposite ends of the seed-hopper are the approximately V-shaped arms 7, which are connected at the angles of intersection and lower ends by transverse bars 8 and 9.

Upon the transverse bar 8 adjacent each feed-tube is secured a pair of brackets 10, to which the feed-tubes are pivoted.

11 designates short flexible couplings which connect the upper ends of the feed-tubes with the spouts 5. By this construction it will be perceived that in the event of the feed-tubes striking an obstruction they will work on their pivots and the lower ends will be swung backward temporarily until they pass and then be returned to their normal positions by the springs 12. The springs 12 are connected to the transverse bar 9 and have their outer ends connected to the lower portions of the seed-tubes 6.

13 designates vertically-movable feed-slides arranged on the inner face of the rear side of the seed-hopper, each slide being provided with an inclined feed-opening adapted to register with the adjacent openings 4 in the hopper. In order to support the feed-slides in their relative positions and prevent displacement thereof, I provide openings in the bottom of the seed-hopper to receive the lower ends of the feed-slides 13 and support their upper ends in brackets 14.

From the foregoing description it will be understood that as the feed-slides are reciprocated the seed will be permitted to pass through the inclined openings of the feed-slides into the seed-tubes and thus deposited upon the ground.

Extending outward and upward from the upper forward corner of the seed-hopper are the angular brackets 15, the upper ends of which are provided with bearings to receive the transverse rock-shaft 16, which is provided at one end with a crank-arm 17. Secured to the shaft 16 and extending rearward therefrom are the short arms 18, which arms are adapted to be received in eyes 19, secured to the upper ends of the feed-slides.

20 designates a sprocket-wheel secured to the bearing-wheel 2 of the gang-plow and around which passes a chain 21, through the medium of which power is transmitted to a smaller sprocket-wheel 22, journaled on a bearing secured to the seed-hopper and around which the chain 21 also passes.

In order to impart the necessary movement to the shaft 16 and thereby reciprocate the feed-slides, I mount a link 23 eccentrically on the sprocket-wheel 22 and connect its other end to the crank-arm 17, as clearly shown in Fig. 1.

The lower portions of the feed-slides are channeled, as at 24, to receive adjusting-slides 25, which have their upper edges inclined to register with the inclined openings in the feed-slides. The slides 25 are designed to serve as feed-regulators and are held in their adjusted positions by set-screws 26, which extend through elongated slots 27, formed in the feed-slides.

28 designates the depending tubes, the rear ends of which extend rearward of the said tubes in parallel planes and are provided with bearings to receive the short shafts upon which the seed-scatterers 29 are secured. The seed-scatterers 29 each comprises an elongated body portion, the lower portion of which is bent forward at right angles thereto, as at 30, and it will be readily seen that as they swing on their pivots seed falling from the seed-tubes will strike the scatterers and be thoroughly scattered and spread over the surface of the ground.

In Fig. 3 I have shown a slight modification of the preferred means for operating the crank-shaft 16, by which construction the endless chain 21 and the link 23 are eliminated and a direct connection between the sprocket-wheel 20 and the crank-arm 17 is effected. In this construction I employ a pitman 31, which has its lower end eccentrically mounted on the sprocket-wheel 20 and its upper end journaled on the lower end of the crank-arm 17.

All the parts being assembled, the operation of the device is as follows: As the gang of plows is moved forward power is transmitted through the endless chain 21 to the sprocket-wheel 22, which, through the medium of the eccentrically-mounted link 23, oscillates the rock-shaft 16, and thereby imparts the necessary reciprocating movement to the feed-slides.

Having thus described the invention, what is claimed as new is—

1. In a device of the class set forth, the combination with a plow-frame, of a bearing-wheel connected to and supporting the said frame, a seed-hopper arranged on the frame and provided with seed-outlets, vertically-disposed reciprocable slides in the hopper adjacent to and coöperating with said outlets, a series of depending tubes connected to the outlets of the hopper and pivotally supported to have a rearward movement, means for returning the tubes to normal position, shoes on the lower ends of the tubes, and seed-scatterers movably attached to and depending from the rear portion of the shoes.

2. In a device of the class set forth, the combination with a plow-frame having a seed-hopper thereon, of a series of depending tubes connected to the seed-hopper and provided with shoes at their lower ends, and depending seed-scatterers pivotally connected to the rear portions of the said shoes.

3. A seeder attachment comprising a seed-hopper provided with seed-openings in one of its walls and having openings in its bottom beneath the said seed-openings, feed-slides arranged adjacent the said seed-openings and having their lower ends projecting through the openings in the bottom of the seed-hopper, means for supporting the upper portions of the feed-slides, brackets secured to the upper sides of the opposite ends of the hopper and formed with bearings, a rock-shaft journaled in said bearings, a connection between the said slides and rock-shaft, depending arms secured to the opposite lower ends of the seed-hopper, a transverse bar connecting the said arms, seed-tubes pivotally connected to said transverse bar, a flexible connection between the upper ends of the seed-tubes and the seed-openings in the hopper, and means for oscillating the said rock-shaft.

4. A seeder comprising a hopper, a series of feed-slides arranged within the hopper, means for operating the feed-slides simultaneously, depending arms secured to the opposite ends of the hopper, a transverse bar connecting the said depending arms, seed-tubes pivotally connected to said transverse bar, depending spouts secured to the seed-hopper above the seed-tubes, a flexible coupling between the said spouts and seed-tubes, and a resilient connection between the lower ends of the said shoes and depending arms.

5. In a device of the character described, the combination with a plow-frame; of a bearing-wheel connected to and supporting the main frame, a seed-hopper arranged on the main frame and having seed-openings in one of its walls, vertically-movable feed-slides arranged adjacent the said seed-openings, eyes secured to the upper ends of the feed-slides, brackets secured to the opposite ends of the hopper and formed with bearings, a rock-shaft journaled in said bearings, a crank-arm on one end of said rock-shaft, a series of arms secured to and projecting outwardly from the said rock-shaft and having their outer ends projecting through the eyes of the feed-slides, and means whereby power is transmitted from the traveling wheel to the said crank-arm.

In testimony whereof I affix my signature in presence of two witnesses.

JACOB TCHOOLJIAN.

Witnesses:
 WM. C. COLSON,
 JOHN EHRLICH.